(12) United States Patent
Schmiedel et al.

(10) Patent No.: US 10,493,633 B2
(45) Date of Patent: Dec. 3, 2019

(54) ROBOT TOOL FOR SETTING SEALING PLUGS HAVING AN ANGLED MOTOR

(71) Applicant: Bayerische Motoren Werke Aktiengesellschaft, Munich (DE)

(72) Inventors: Ingo Schmiedel, Altomuenster/Asbach (DE); Max Kossmann, Munich (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 123 days.

(21) Appl. No.: 15/719,673

(22) Filed: Sep. 29, 2017

(65) Prior Publication Data

US 2018/0021958 A1 Jan. 25, 2018

Related U.S. Application Data

(63) Continuation of application No. PCT/EP2016/055230, filed on Mar. 11, 2016.

(30) Foreign Application Priority Data

Apr. 29, 2015 (DE) .................. 10 2015 207 847

(51) Int. Cl.
*B23P 19/00* (2006.01)
*B25J 9/12* (2006.01)
(Continued)

(52) U.S. Cl.
CPC ......... *B25J 15/0019* (2013.01); *B23P 19/001* (2013.01); *B25J 9/12* (2013.01);
(Continued)

(58) Field of Classification Search
CPC ...... B25J 15/0019; B25J 19/0025; B25J 9/12; B23P 19/001; B23P 2700/50; B62D 65/02; B62D 25/24
See application file for complete search history.

(56) References Cited

U.S. PATENT DOCUMENTS 9,656,391 B2 * 5/2017 Kossmann ............. B25J 9/1687
2011/0182708 A1 7/2011 Baudisch et al.
(Continued)

FOREIGN PATENT DOCUMENTS

CN 201313735 Y 9/2009
CN 203936604 U 11/2014
(Continued)

OTHER PUBLICATIONS

English translation of Chinese Office Action issued in counterpart Chinese Application No. 201680004674.6 dated Dec. 24, 2018 (nine (9) pages).

(Continued)

*Primary Examiner* — John C Hong
(74) *Attorney, Agent, or Firm* — Crowell & Moring LLP

(57) ABSTRACT

A robot tool for placing sealing plugs in openings in a vehicle body component includes a placing installation, in which a plug magazine having a plurality of plugs is accommodated, which plugs can be set into the respective openings in direct succession by the placing installation without reloading. A method is provided for securely setting the plugs, wherein the plugs can be pushed out of the plug magazine accommodated in the placing installation in predefined steps by a drive unit, wherein the plug magazine extends axially in an axial direction and the drive unit is arranged on the plug magazine at an angle of 90-170° to the axial direction.

11 Claims, 2 Drawing Sheets

(51) Int. Cl.
  *B25J 19/00* (2006.01)
  *B25J 15/00* (2006.01)
  *B62D 65/02* (2006.01)
  *B62D 25/24* (2006.01)

(52) U.S. Cl.
  CPC .......... *B25J 19/0025* (2013.01); *B62D 65/02* (2013.01); *B23P 2700/50* (2013.01); *B62D 25/24* (2013.01)

(56) References Cited

U.S. PATENT DOCUMENTS

| | | |
|---|---|---|
| 2011/0209320 A1 | 9/2011 | Connolly |
| 2012/0330463 A1 | 12/2012 | Schreiber et al. |

FOREIGN PATENT DOCUMENTS

| | | |
|---|---|---|
| DE | 2144359 A1 | 3/1973 |
| DE | 10 2008 056 246 A1 | 5/2010 |
| DE | 10 2010 005 798 A1 | 7/2011 |
| DE | 10 2010 010 718 A1 | 9/2011 |
| DE | 10 2014 007 831 A1 | 12/2014 |
| EP | 2366506 A3 | 11/2012 |
| GB | 1 399 924 A | 7/1975 |
| JP | 11-151625 A | 6/1999 |
| WO | WO 2010/052602 A2 | 5/2010 |

OTHER PUBLICATIONS

Chinese-language Office Action issued in counterpart Chinese Application No. 201680004674.6 dated Jun. 26, 2018 with English translation (ten (10) pages).

International Search Report (PCT/ISA/210) issued in PCT Application No. PCT/EP2016/055230 dated May 20, 2016 with English translation (six pages).

German-language Written Opinion (PCT/ISA/237) issued in PCT Application No. PCT/EP2016/055230 dated May 20, 2016 (seven pages).

German Search Report issued in counterpart German Application No. 10 2015 207 847.7 dated Dec. 2, 2015 with partial English translation (13 pages).

\* cited by examiner

ROBOT TOOL FOR SETTING SEALING PLUGS HAVING AN ANGLED MOTOR

CROSS REFERENCE TO RELATED APPLICATIONS

This application is a continuation of PCT International Application No. PCT/EP2016/055230, filed Mar. 11, 2016, which claims priority under 35 U.S.C. § 119 from German Patent Application No. 10 2015 207 847.7, filed Apr. 29, 2015, the entire disclosures of which are herein expressly incorporated by reference.

This application contains subject matter related to U.S. application Ser. No. 15/719,648, entitled "Robot Tool for Setting Sealing Plugs," filed on Sep. 29, 2017.

BACKGROUND AND SUMMARY OF THE INVENTION

The invention relates to a robot tool for placing sealing plugs into openings in an automotive body component, in particular also for placing the sealing plugs into openings in regions that are difficult to access. The invention furthermore relates to a method for placing sealing plugs into an opening in an automotive body component, using the robot tool.

In order for liquid paint, after painting, to be able to rapidly flow out of the cavities in automotive body components, the latter are provided with numerous, in some instances up to a few hundred, openings. Bores are also to be provided for locating welding spots. Moreover, wax for sealing the automotive body component can be injected into the cavities through these openings. All of the openings have to be closed again during assembly, so as to prevent the ingress of moisture or water, respectively, and to protect the vehicle against corrosion during operation. The openings are closed by way of so-called sealing plugs of a plastics material, there being various diameters of said sealing plugs. The sealing plugs are, in most instances, inserted manually into the openings by operators.

This handling mode has various disadvantages. The operation is not ergonomic for the operator placing the sealing plugs, since said operator has to bend down and stretch out in order for the sealing plugs to be placed. Moreover, a significant amount of force is required in order for the sealing plug to be pushed into the respective opening, which is very laborious in the long run. This can lead to a loss of concentration and thus to a higher susceptibility to errors. Since up to a few hundred sealing plugs have to be placed, depending on the vehicle model, the sealing plugs are repeatedly positioned by various operators at different stations that are distributed throughout the production process. This requires many hand movements which have to be learned by innumerable different operators during a significant amount of training time.

On account of the various diameters of the sealing plugs there is the possibility of the latter being wrongly placed in individual cases. However, it also cannot be excluded that the respective sealing plug is indeed placed at the correct location but is not pushed into the automotive body with sufficient force and thus does not provide complete sealing (or even drops out when the vehicle is in motion). Individual sealing plugs can also be simply forgotten. On account thereof, moisture or water can get into the automotive body, leading to corrosion.

Finally, the openings are bores with sharp edges on which the operator could be injured when placing the sealing plugs.

There are also robot-supported methods for inserting the sealing plugs. However, in each case only one sealing plug can be received herein on the placing installation of the robot tool. Furthermore, a reverse movement to the reloading magazine has to be performed once each sealing plug has been placed. Much time is lost on account thereof.

Also, the robot tool operates by vacuum or compressed air, respectively, and apart from the electrical connector also requires a supply of air. The provision of compressed air is generally very energy intensive. Furthermore, on account of the necessary use of compressed-air hoses, there is the risk of entanglement or tripping, respectively, that is to say of injury.

It is also disadvantageous in the case of robot tools used to date that the latter are not adapted for human-robot interaction. The robot station is fenced in such that no human can work on the automotive body component while the sealing plugs are being placed. A tool adapted for human-robot interaction has to be designed in a manner corresponding to lightweight-construction robots, so as to have an output and force limitation according to the definition as per DIN ISO 10218, part 1 & part 2, in order for a collaborating operation as per TS-15066 to be enabled. It is important herein that there is no risk emanating from the potential actuators of the tool.

It is also disadvantageous that the vacuum head of the robot tool that is usually used is not interchangeable. In each case only one specific sealing plug having the diameter that matches the vacuum head can thus be used. Once the sealing plug has been placed, confidence is then placed in a good fit, without any post-checking being provided. Should the sealing plug fail to hold, moisture can ingress, as has been described.

It is furthermore problematic that sealing plugs also have to be placed in regions of the vehicles that are difficult to access, for example on the vehicle underbody. It is required to this end that the tools employed have an axial extent that is as short as possible, so as to be able to be employed in narrow spacings from or intermediate spaces to, respectively, the vehicle.

The invention is therefore based on the object of providing a robot tool having minimal space requirements, by way of which sealing plugs can be placed in a rapid and variable manner and without continual reloading even in regions of the vehicle that are difficult to access, guaranteeing a durable fit of the sealing plugs. It is furthermore an object of the invention to provide a method by which the sealing plugs can be placed with minimal space requirements by the robot tool in a more rapid manner and in regions of the vehicle that are difficult to access.

According to the invention, a robot tool for placing sealing plugs into openings in an automotive body component is provided. The robot tool has a placing installation on which a sealing plug magazine having a multiplicity of lined-up sealing plugs, which by means of the placing installation are capable of being placed in a directly sequential manner and without reloading into the respective openings of the automotive body component, is disposed. The sealing plugs, by way of a drive unit, are capable of being ejected in predefined steps from the sealing plug magazine that is received in the placing installation. The sealing plug magazine extends axially in an axial direction, and the drive unit is disposed on the sealing plug magazine at an angle $\alpha$ of 90-150°, in particular 90-120° in relation to the axial direction.

Compared to an exclusively linear arrangement of the drive unit and of the sealing plug magazine in the axial direction, the installation space required for the robot tool, said installation space having a drive unit that is disposed so as to be angled relative to the sealing plug magazine, is significantly reduced such that even regions that are difficult to access, such as the vehicle underbody, can be populated with sealing plugs. The tool overall becomes more compact.

In one advantageous variant embodiment of the invention, it is furthermore provided that the drive unit comprises a motor and a flexible brush cable that is configured as an indexing element, wherein the brush cable is connected to a slide which is capable of being repositioned in the first direction and by way of which the sealing plugs are capable of being moved or ejected, respectively, out of the sealing plug magazine. The use according to the invention of a flexible brush cable solves the issue of the drive unit and sealing plug magazine construction elements that are disposed in an angled manner, and enables indexing of the slide in the axial direction, despite the drive unit being disposed so as to be oblique to the sealing plug magazine and thus to the sealing plugs that are stacked therein. A flexible helical shaft is defined as a "brush cable".

An embodiment in which the brush cable has a deflection at an angle $\beta$ of 60-120°, in particular of 80-100°, furthermore preferably of 90°, is particularly favorable.

In one embodiment, the drive unit comprises a drive element which engages the brush cable and during operation moves said brush cable such that the latter repositions the slide. The drive element to this end has force introduction elements, for example teeth, which engage in complementary receptacles that are provided on the brush cable and move the brush cable along the deflection.

It is provided in one refinement of the invention that an encircling elastic lip, which holds the sealing plugs in the sealing plug magazine and by way of an axial movement of the sealing plugs is capable of being elastically bent in the axial direction of the robot tool, is provided on an outlet of the placing installation. The integration of the sealing plug magazine and of the placing installation enables a multiplicity of sealing plugs to be sequentially placed without the placing installation having to repeatedly pick up an individual sealing plug. A rectilinear and ideally guided ejection is guaranteed by guiding the sealing plugs by way of an exact fit in the sealing plug magazine. The integration of the elastic lip guarantees reliable installation of the sealing plugs at the respective opening and retains the respective successive sealing plug in the sealing plug magazine. On account of the elasticity, there is no mechanical action on the sealing plug per se, such that the assembly does not influence the predefined and established properties of the sealing plug.

In one advantageous variant embodiment it is furthermore provided that the elastic lip on the placing installation is disposed so as to be axially spaced from an external axial periphery of the placing installation. The spacing guarantees a planar bearing of the placing installation on the component to be provided with the sealing plug prior to the sealing plug being placed and thereafter. It is provided in one embodiment according to the invention that the sealing plugs in each case have one non-elastic cover, wherein the frontmost sealing plug in the sealing plug magazine in the region of the placing installation is held by the elastic lip. The elastic lip encompasses the cover of the sealing plug and fixes said cover in a positionally accurate manner in the sealing plug magazine. The fact that the cover is non-elastic enables a predefined shape which remains unmodified during the assembly.

The elastic lip bears on the respective cover of the frontmost sealing plug, and is bent back by the cover in the course of the ejection movement of the sealing plug. As soon as the sealing plug has been placed on the component, the elastic lip folds back into the placing installation and holds the successive sealing plug in the magazine. The elastic lip guides the sealing plug in the axial placing direction during the placing movement and prevents canting or an oblique penetration of the opening of the component.

In one preferred embodiment of the invention it is furthermore provided that the robot tool is adapted for human-robot interaction and the placing installation is capable of being guided sequentially to the respective openings in order for the sealing plugs to be placed. The positioning can be performed so as to be automatically based on a camera or by any other arbitrary method known in the prior art (for example, a force-regulated positioning of the robot, positioning by means of sensors, (capacitive, proximity switch, light sensor, etc.)). The placing installation herein is guided to the opening, while the insertion of the sealing plug is performed by machine force. By way of the design adapted for human-robot interaction it is also enabled that, apart from placing sealing plugs, other operations can also be carried out simultaneously on the automotive body component and that the placing of the sealing plugs is capable of being integrated into further assembly procedures.

In one favorable exemplary embodiment, the invention furthermore provides that the sealing plugs, by way of an electric spindle drive, are capable of being ejected in predefined steps from the sealing plug magazine that is received in the placing installation, for example by using a spindle motor. On account thereof, it is possible for the sealing plugs, prior to and during the placing procedure, in terms of the penetration depth to be positioned precisely in the opening. Also, a preliminary (preloading) position can be guaranteed for an improved introduction of the sealing plugs into the opening.

According to the invention, the placing installation of the robot tool in one exemplary embodiment is embodied so as to be interchangeable such that dissimilar sealing plugs are placeable into respectively dissimilar openings. Various sealing plug sizes and sealing plug configurations can be placed, depending on the automotive body and depending on the opening.

The invention furthermore relates to a method for placing the sealing plugs into the openings in the automotive body component, using the above-described robot tool, and is distinguished in that the sealing plug to be placed is first ejected from the outlet of the placing installation by a predetermined measure by way of the spindle drive of the placing installation, and the partially ejected sealing plug by means of the placing installation is inserted into the opening to be closed such that part of the sealing plug engages in the opening from behind so as to be held therein. The sealing plug is finally ejected from the placing installation, and the placing installation is retracted, wherein the sealing plugs by way of the drive unit are ejected in predefined steps from the sealing plug magazine that is received in the placing installation, while the sealing plug magazine extends axially in a first direction, and the drive unit is disposed on the sealing plug magazine at an angle $\alpha$ of 90-170° in relation to the first direction.

A method step according to which, in order for the sealing plug to be placed, the placing installation is switched so as to freely oscillate such that the sealing plug by way of the oscillating movement of the placing installation and of components connected thereto is positioned in a self-acting manner so as to be centric to the opening to be closed, is favorable herein. It is advantageous herein if the sealing plug has a conical configuration in the region to be introduced into the opening.

By utilizing the robot tool according to the invention and the respective method, no human has to carry out any movement that is unfavorable to him/her in terms of ergonomics. The effort in terms of force for placing the sealing plugs is performed by the machine. Owing to the fast placing procedure, many different operators no longer have to be tasked with inserting the sealing plugs. Training time and planning time, that is to say time during which the operator is busy with installation work on each vehicle, is saved. The insertion of the sealing plugs by the robot is performed much more rapidly than is the case with manual labor, on account of which costs can be saved. Furthermore, the robot always places the sealing plugs at the correct location, independently of the diameter of said sealing plugs. Errors can thus be reduced and the quality of placing can be increased. Finally, the operator is no longer in contact with the sharp-edged openings and can thus no longer be injured on the latter. On account of the angled embodiment of the sealing plug magazine and of the drive unit, regions of the vehicles which are difficult to access and offer only limited space for the use of a tool can also be provided with sealing plugs.

As opposed to previous robotic tools, on account of the lining up of a plurality of sealing plugs in the sealing plug magazine, it is no longer necessary for a new sealing plug to be picked up after each insertion procedure. Time and costs can thus be saved. By using the spindle drive and by omitting the compressed-air vacuum mechanism, energy and costs are saved on the one hand, and the compressed-air hoses can also be omitted, on the other hand. The complexity and the risk of injury are minimized on account thereof.

By way of the placing installation that is designed to be replaceable, the robot tool can be adapted to the respective requirement or to the respective diameter of the sealing plug, respectively. The robot tool is thus universally employable.

In as far as technically possible, all above-described features can be freely combined with one another.

Other objects, advantages and novel features of the present invention will become apparent from the following detailed description of one or more preferred embodiments when considered in conjunction with the accompanying drawings.

BRIEF DESCRIPTION OF THE DRAWINGS

The figures are exemplary and schematic. The same reference signs identify the same parts in all views.

DETAILED DESCRIPTION OF THE DRAWINGS

Figure 1:
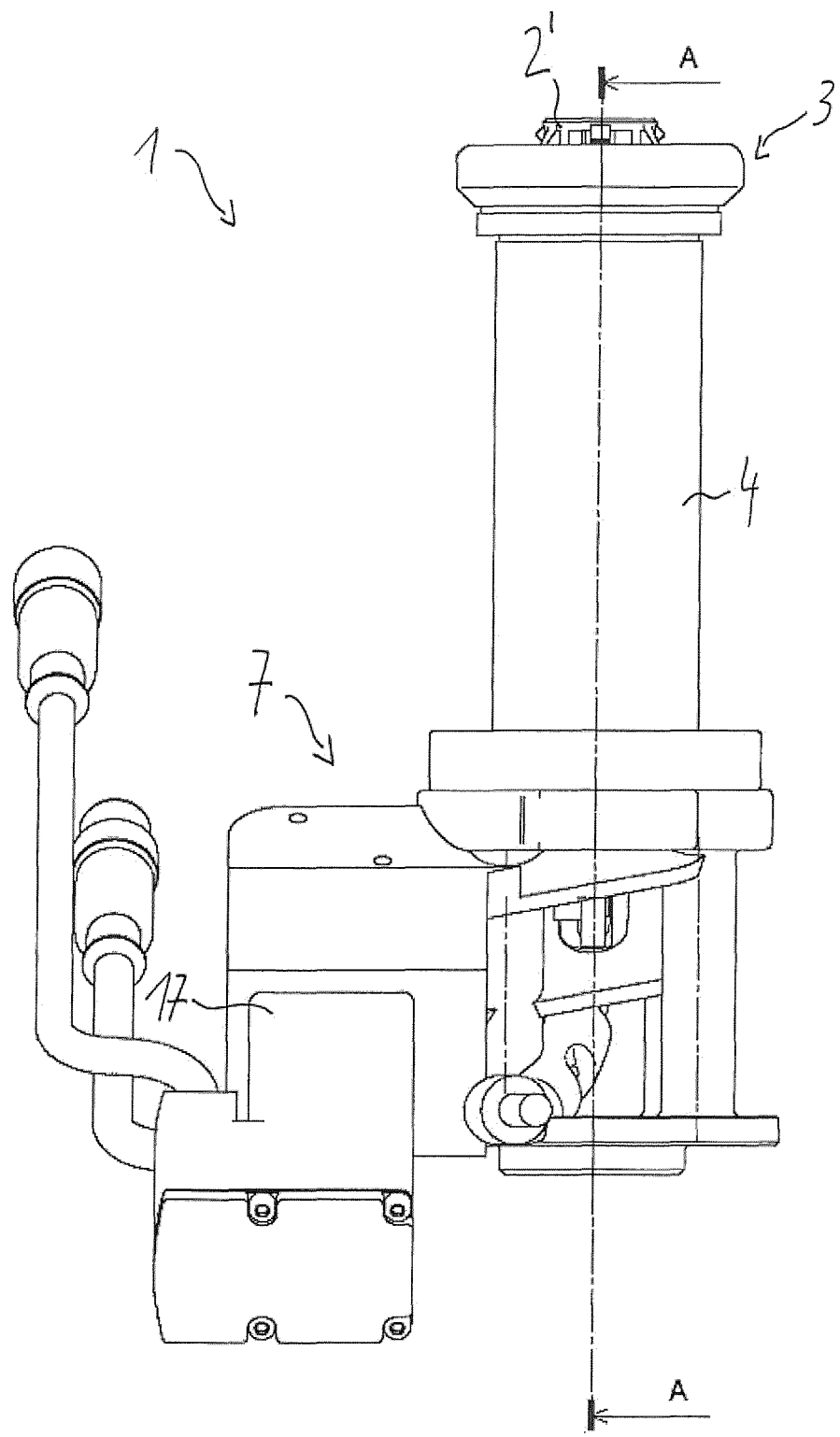
FIG. 1 is a schematic diagram of a robot tool according to an embodiment of the invention.

A robot tool 1 for placing sealing plugs 2 into openings in an automotive body component is shown in FIG. 1. The robot tool 1 has a placing installation (setting device) 3 on which a sealing plug magazine 4 having a multiplicity of sealing plugs 2 that are lined-up therein is disposed. The sealing plugs 2 that are axially aligned one behind the other in the sealing plug magazine 4 are ejected in predefined steps from the outlet 9 by way of a slide 8 that is capable of being repositioned in the longitudinal direction by a drive unit 7, in order for exact positioning of the sealing plugs 2 in the respective opening to be guaranteed. The further components of the spindle drive 7 are not illustrated.

The robot tool 1 is adapted for human-robot interaction and for a partially automated or a manual operation can have corresponding receptacles (not illustrated) for human guidance. The placing installation 3 on the outlet 9 thereof has the elastic encircling lip 10 by way of which the non-elastic cover 22 of the sealing plug 2 is held. The placing installation 3 is releasably fastened to the sealing plug magazine 4, for example screwed thereto, so as to be interchangeable.

Figure 2:
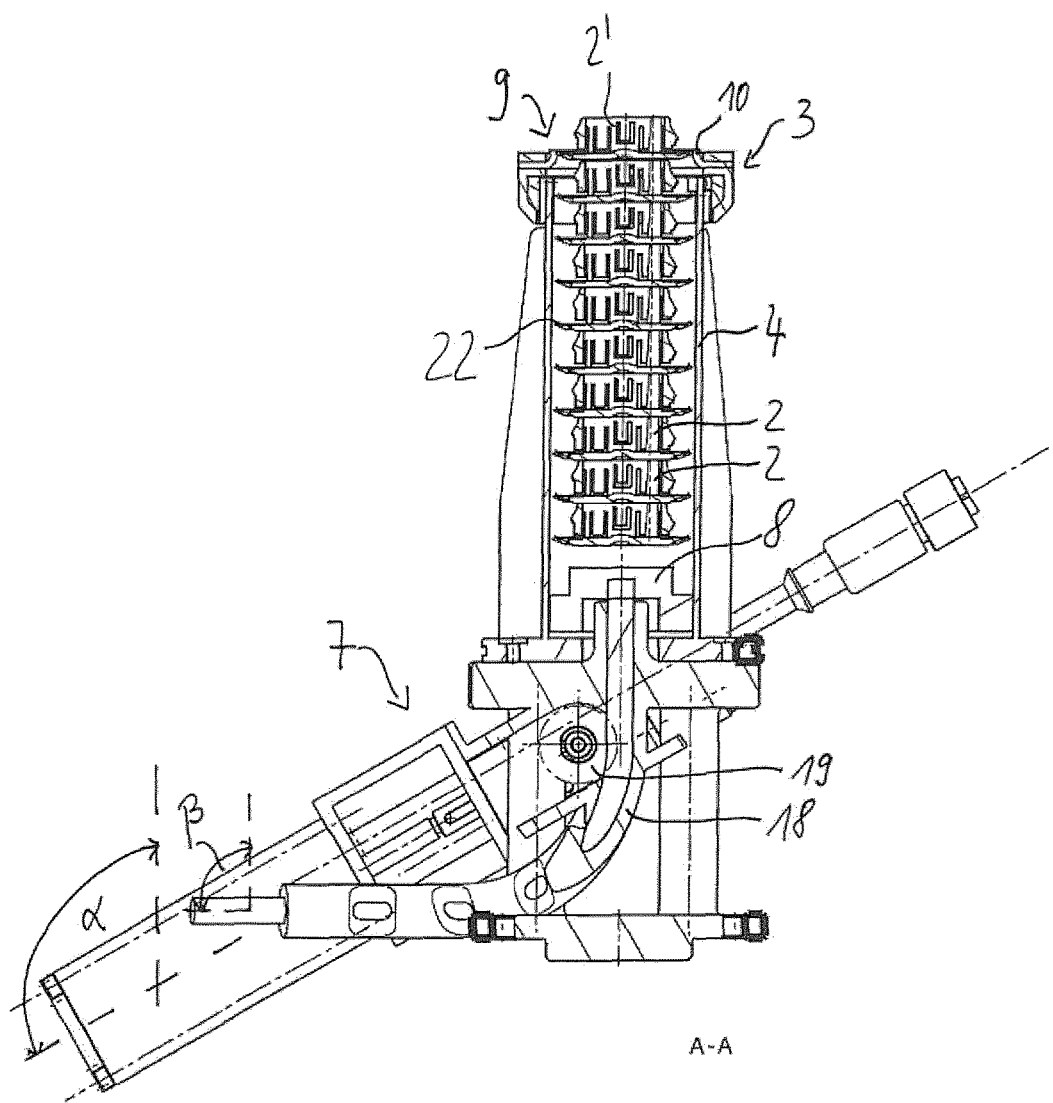
FIG. 2 is a sectional view A-A from FIG. 1.

A sectional view A-A from FIG. 1 of a placing installation 3 of a robot tool 1 that is disposed on the sealing plug magazine 4 is shown in FIG. 2, in which placing installation 3 the elastic lip 10 is bent back in the axial direction by the cover 22 of the frontmost sealing plug 2'. In the state shown, the foremost sealing plug 2' is being ejected from the sealing plug magazine 4. Once the sealing plug 2' has exited, the elastic lip 10 folds back to a horizontal position. The elastic lip 10 is disposed so as to be spaced apart from the external axial periphery of the placing installation 3.

The sealing plug magazine 4 extends in the axial direction. The drive unit 7 relative to the sealing plug magazine 4 is disposed so as to be inclined by an angle $\alpha$ of 120° in relation to the axial direction. The drive unit comprises the motor 17, the flexible brush cable 18 that is configured as an indexing element, and the drive element 19 which is configured as a rotating shaft having teeth engaging in the brush cable 18. The rotation of the drive element 19 conveys the flexible brush cable 18 and thus moves the slide 8 fastened to the latter, and consequently the sealing plugs 2, in the axial direction. The brush cable 18 in the drive unit 7 has a deflection at an angle $\beta$ of 90°.

In the method for placing a sealing plug 2 into an opening in an automotive body component, the slide 8 by way of the drive unit 7 is repositioned in the longitudinal direction, on account of which the sealing plugs 2 by way of the placing installation 3 can be sequentially ejected from the sealing plug magazine 4. In a state in which the sealing plug 2 is ejected from the outlet 9 of the placing installation 3 by a predetermined measure, the sealing plug 2 is inserted into the opening to be closed such that the rear engagement portion 21 of the sealing plug 2 engages in the opening wall from behind. In order for the sealing plug 2 to be inserted, the placing installation 3 and the connected components are switched so as to be freely oscillating such that the sealing plug 2 by way of the oscillating movement of the placing installation 3 is positioned in a self-acting (centering) manner so as to be centric to the opening to be closed. The rear engagement portion 21 of the sealing plug 2 thus securely engages in the wall of the opening from behind. The sealing plug 2 by way of the spindle drive 7 is finally completely ejected from the sealing plug magazine 4.

In order for the sealing plug magazine 4 to be replenished, the latter can be exchanged, or a stack of sealing plugs 2 can be pushed-fitted or dropped thereover, respectively, by way of the placing installation 3, wherein the spindle drive 7 herein repositions slowly, in a manner analogous but counter to the push-fitting speed of the robot, so as to prevent a wrong orientation of the sealing plug 2 (rotated by 180 degrees in the magazine). The stack of sealing plugs 2 herein is preferably disposed in a guide.

The invention is not restricted in its embodiment to the preferred exemplary embodiments stated above. Rather, a number of variants are conceivable which make use of the solution illustrated, even with embodiments that are fundamentally different. For example, other sealing plug constructions which are adapted to the respective openings and wall thicknesses are possible. Furthermore, the elastic lip can be produced from various materials as long as an adequate holding and guiding function and an appropriate force for bending back are guaranteed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A robot tool for placing sealing plugs into openings in an automotive body component, comprising:
    a sealing plug magazine having a plurality of lined-up sealing plugs;
    a placing installation on which the sealing plug magazine is disposed, wherein via the placing installation the plurality of the sealing plugs are capable of being placed in a directly sequential manner and without reloading into respective openings of the automotive body component;
    a drive unit configured to eject the sealing plugs in predefined steps from the sealing plug magazine disposed on the placing installation, wherein
    the sealing plug magazine extends in an axial direction, and
    the drive unit is disposed relative to the sealing plug magazine at an angle of 90° to 170° in relation to the axial direction.

2. The robot tool according to claim 1, further comprising:
    an encircling elastic lip provided on an outlet of the placing installation that holds the sealing plugs in the sealing plug magazine, wherein
    via an axial movement of the sealing plugs, the elastic lip is capable of being elastically bent in the axial direction of the robot tool.

3. The robot tool according to claim 2, wherein
    each of the sealing plugs has a non-elastic cover, and
    a forward most sealing plug in the region of the placing installation is held on the cover by the elastic lip.

4. The robot tool according to claim 1, wherein
    the robot tool is adapted for human-robot interaction, and
    the placing installation is capable of being guided to the openings sequentially and in an automated manner.

5. The robot tool according to claim 1, wherein
    the robot tool is configured to receive interchangeable placing installations, wherein dissimilar sealing plugs are placeable via different placing installations into respectively dissimilar openings.

6. A robot tool for placing sealing plugs into openings in an automotive body component, comprising:
    a sealing plug magazine having a plurality of lined-up sealing plugs;
    a placing installation on which the sealing plug magazine is disposed, wherein via the placing installation the plurality of the sealing plugs are capable of being placed in a directly sequential manner and without reloading into respective openings of the automotive body component;
    a drive unit configured to eject the sealing plugs in predefined steps from the sealing plug magazine disposed on the placing installation, wherein
    the sealing plug magazine extends in an axial direction,
    the drive unit is disposed relative to the sealing plug magazine at an angle of 90° to 170° in relation to the axial direction,
    the drive unit comprises a motor and a flexible brush cable configured as an indexing element, and
    the brush cable is connected to a slide that is capable of being repositioned in the axial direction and by way of which the sealing plugs are capable of being moved out of the sealing plug magazine.

7. The robot tool according to claim 6, wherein the brush cable has a deflection at an angle of 60° to 120°.

8. The robot tool according to claim 7, wherein
    the drive unit further comprises a drive that engages the brush cable and during operation moves the brush cable such that the brush cable repositions the slide.

9. The robot tool according to claim 6, wherein
    the drive unit further comprises a drive that engages the brush cable and during operation moves the brush cable such that the brush cable repositions the slide.

10. A method for placing a sealing plug into an opening in an automotive body component via a robot tool according to claim 1, the method comprising the steps of:
    ejecting the sealing plug to be placed from an outlet of the placing installation by a predetermined amount via the drive unit;
    inserting the partially ejected sealing plug via the placing installation in an automated manner into the opening to be closed such that a portion of the sealing plug engages in the opening from behind so as to be held therein;
    ejecting the sealing plug from the placing installation;
    retracting the placing installation, wherein
    the sealing plug, via the drive unit, is ejected in predefined steps from the sealing plug magazine disposed in a placing installation, and
    the sealing plug magazine extends axially in an axial direction and the drive unit is disposed on the sealing plug magazine at an angle of 90° to 150° in relation to the axial direction.

11. The method according to claim 10, wherein
    in order for the sealing plug to be placed, the placing installation is configured to freely oscillate, wherein the sealing plug, via an oscillating movement of the placing installation, is positioned in a self-acting manner with respect to the opening to be closed.

* * * * *